L. MUTHER & E. HENTSCHEL.
Sewing-Machine Casters.
No. 160,276.     Patented March 2, 1875.
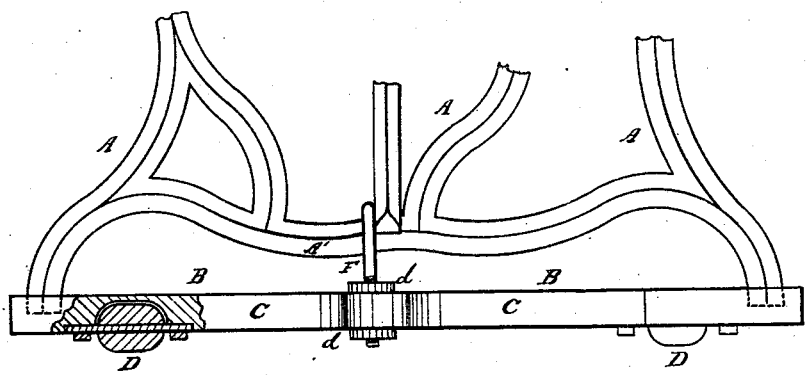
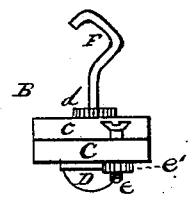
WITNESSES.
INVENTORS.
Lorenz Muther
Emil Hentschel
By Gridley & Warner
their Attys

UNITED STATES PATENT OFFICE.

LORENZ MUTHER AND EMIL HENTSCHEL, OF CHICAGO, ILL., ASSIGNORS TO B. W. PHILLIPS AND AMOS B. KEITH, OF SAME PLACE.

INPROVEMENT IN SEWING-MACHINE CASTERS.

Specification forming part of Letters Patent No. 160,276, dated March 2, 1875; application filed December 29, 1874.

*To all whom it may concern:*

Be it known that we, LORENZ MUTHER and EMIL HENTSCHEL, both of the city of Chicago, in the county of Cook and State of Illinois, have invented a new and useful Improvement in Casters for Sewing-Machines, of which invention the following is a full, clear, and exact description, which will enable others skilled in the art to make and use the same, reference being had to the accompanying drawing forming part hereof, and in which—

Figure 1 is a side elevation of a sewing-machine caster provided with our improvements, and Fig. 2 an end elevation of the same.

Like letters of reference indicate like parts.

Our invention consists in providing the caster-attaching device with a central adjustable hook, to engage a cross-bar in the legs or supports, substantially as set forth.

In the drawing, A A' represent the legs or standards of a sewing-machine table. B is a caster attachment. In the example shown the caster attachment consists of a bar, C, having its upper face cut at the ends to receive the feet or lower ends of the standards. D D are rollers arranged for contact with the floor, and the spindles of which have bearings in the bar C. F is a hook passing freely through the central part of the bar C. The upper end of this hook is bent to engage the part A', and its lower end is screw-threaded and provided with the nuts $d\ d$, one of which is arranged above and the other below the bar C. We deem it preferable, but not essential, to mill the nuts $d\ d$. In applying the caster device, it is arranged to receive the feet of the standards, and the hook F is arranged over the part A'. The nuts $d\ d$ are then turned until the caster device is thereby firmly held in its position.

It will be perceived from the foregoing description that the hook F is vertically adjustable for the purposes set forth.

Having thus described our invention, what we claim as new, and desire to secure by Letters Patent, is—

A sewing-machine caster-attaching device, consisting of the cross-bar C, constructed to receive the feet of the standards, and provided with rollers D and with the vertically-adjustable hook F, substantially as and for the purposes specified.

LORENZ MUTHER.
EMIL HENTSCHEL.

Witnesses:
F. F. WARNER,
N. C. GRIDLEY.